(12) United States Patent
Nichols et al.

(10) Patent No.: US 10,781,705 B2
(45) Date of Patent: Sep. 22, 2020

(54) INTER-COMPRESSOR FLOW DIVIDER PROFILING

(71) Applicant: PRATT & WHITNEY CANADA CORP., Longueuil (CA)

(72) Inventors: Jason Nichols, Mississauga (CA); Thomas Veitch, Toronto (CA); Peter Townsend, Mississauga (CA); Hien Duong, Mississauga (CA); Guiherme Watson, Thornhill (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 98 days.

(21) Appl. No.: 16/201,255

(22) Filed: Nov. 27, 2018

(65) Prior Publication Data
US 2020/0165924 A1    May 28, 2020

(51) Int. Cl.
*F01D 9/04* (2006.01)
*F02C 3/08* (2006.01)
(Continued)

(52) U.S. Cl.
CPC .............. *F01D 9/04* (2013.01); *F01D 25/26* (2013.01); *F02C 3/08* (2013.01); *F02C 7/06* (2013.01);
(Continued)

(58) Field of Classification Search
CPC .... F01D 9/04; F01D 25/26; F02C 3/08; F02C 7/20; F02C 7/28; F05D 2220/32;
(Continued)

(56) References Cited

U.S. PATENT DOCUMENTS 4,645,419 A * 2/1987 Furuya .................. F04D 29/444
                                                           415/208.2
4,989,406 A    2/1991 Vdoviak et al.
(Continued)

FOREIGN PATENT DOCUMENTS

EP        0043554 A1    1/1982
EP        3241989 A1   11/2017
(Continued)

OTHER PUBLICATIONS

Espacenet Machine Translation of EP-3364039-A1 Hartmann Jorg Paul, Recirculation Stage, 2018; Priority Date Feb. 21, 2017 (Year: 2018).*

(Continued)

*Primary Examiner* — Nathaniel E Wihe
*Assistant Examiner* — Ryan C Clark
(74) *Attorney, Agent, or Firm* — Norton Rose Fulbright Canada LLP

(57) ABSTRACT

An inter-compressor case for a gas turbine engine is disclosed. The inter-compressor case comprises: an outer casing and an inner casing radially spaced apart relative to a longitudinal axis; a gas path extending from a plurality of radial inlets arranged in a circumferentially spaced apart array around the outer casing to an annular outlet defined by an axially extending downstream portion of the outer casing and an axially extending downstream portion of the inner casing; a plurality of struts having a gas path surface extending across the gas path between the outer casing and the inner casing; and a plurality of flow separators extending from the adjacent radial inlets. The flow separators have trailing edges disposed upstream of the annular outlet and include a plurality of full length flow separators and a plurality of truncated flow separators.

10 Claims, 5 Drawing Sheets

(51) Int. Cl.
  *F02C 7/06* (2006.01)
  *F02C 7/20* (2006.01)
  *F01D 25/26* (2006.01)
  *F04D 29/44* (2006.01)
  *F04D 17/12* (2006.01)
  *F04D 9/06* (2006.01)

(52) U.S. Cl.
  CPC .............. *F02C 7/20* (2013.01); *F04D 9/065* (2013.01); *F04D 17/12* (2013.01); *F04D 17/122* (2013.01); *F04D 29/441* (2013.01); *F04D 29/444* (2013.01); *F05D 2220/32* (2013.01); *F05D 2240/14* (2013.01); *F05D 2240/90* (2013.01); *F05D 2260/60* (2013.01)

(58) Field of Classification Search
  CPC ............. F05D 2240/12; F05D 2240/14; F05D 2240/90; F05D 2260/60; F04D 17/12; F04D 17/122; F04D 17/14
  See application file for complete search history.

(56) References Cited

U.S. PATENT DOCUMENTS

| | | | |
|---|---|---|---|
| 6,082,966 | A | 7/2000 | Hall et al. |
| 6,345,503 | B1 * | 2/2002 | Gladden ............... F02B 37/013 |
| | | | 415/120 |
| 6,363,706 | B1 * | 4/2002 | Meister ..................... F02C 3/10 |
| | | | 60/774 |
| 6,589,015 | B1 | 7/2003 | Roberts et al. |
| 7,717,672 | B2 * | 5/2010 | Barton .................... F01D 9/041 |
| | | | 415/208.2 |
| 8,157,517 | B2 * | 4/2012 | Feher .................... F04D 17/122 |
| | | | 415/199.2 |
| 8,182,204 | B2 | 5/2012 | Durocher et al. |
| 8,696,306 | B2 | 4/2014 | Clemen |
| 8,757,965 | B2 | 6/2014 | Baralon |
| 9,068,460 | B2 | 6/2015 | Suciu et al. |
| 9,121,284 | B2 | 9/2015 | Pope |
| 9,670,789 | B2 | 6/2017 | Jansson et al. |
| 9,909,434 | B2 | 3/2018 | Tsifourdaris et al. |
| 10,060,263 | B2 | 8/2018 | Van Ness et al. |
| 10,087,950 | B2 * | 10/2018 | Nakaniwa ............. F04D 17/122 |
| 10,221,707 | B2 | 3/2019 | Paradis et al. |
| 10,267,170 | B2 | 4/2019 | Clark et al. |
| 2002/0106278 | A1 * | 8/2002 | Koga ..................... F04D 17/122 |
| | | | 415/211.2 |
| 2007/0140889 | A1 * | 6/2007 | Chen ..................... F04D 17/122 |
| | | | 418/183 |
| 2008/0072566 | A1 | 3/2008 | Eleftheriou |
| 2010/0272564 | A1 * | 10/2010 | Richter ................. F04D 17/122 |
| | | | 415/208.1 |
| 2015/0260103 | A1 | 9/2015 | Yu et al. |
| 2017/0022835 | A1 | 1/2017 | Clark et al. |
| 2018/0252113 | A1 | 9/2018 | Northall et al. |
| 2018/0252231 | A1 | 9/2018 | Northall et al. |
| 2018/0306041 | A1 | 10/2018 | Peters et al. |
| 2018/0347584 | A1 * | 12/2018 | Larosiliere ............ F04D 29/444 |
| 2019/0024521 | A1 | 1/2019 | Hoeger et al. |
| 2019/0107046 | A1 | 4/2019 | Bowden et al. |
| 2019/0178259 | A1 * | 6/2019 | McCabe ................ F25B 31/026 |
| 2020/0003226 | A1 * | 1/2020 | Yamashita ............ F04D 29/444 |

FOREIGN PATENT DOCUMENTS

| | | | | |
|---|---|---|---|---|
| EP | 3364039 | A1 * | 8/2018 | .......... F04D 17/122 |
| EP | 3369893 | A1 * | 9/2018 | ............... F02C 3/06 |
| EP | 3369893 | A1 | 9/2018 | |
| FR | 3007458 | A1 | 12/2014 | |
| WO | 200129424 | A1 | 4/2001 | |
| WO | 2019091965 | A1 | 5/2019 | |
| WO | 2019107488 | A1 | 6/2019 | |

OTHER PUBLICATIONS

English translation of International Patent Publication No. WO 2019107488 dated Jun. 6, 2019, https://patents.google.com/patent/WO2019107488A1/en?oq=WO2019107488A1, accessed on Apr. 17, 2020.

European Patent Office, Communication pursuant to Rule 62 EPC regarding European patent application No. 19211952 dated Apr. 29, 2020, Munich Germany.

English translation of French Document No. 3007458 dated Dec. 26, 2014, https://patents.google.com/patent/FR3007458A1/en?oq=FR3007458A1, accessed on Jul. 17, 2020.

* cited by examiner

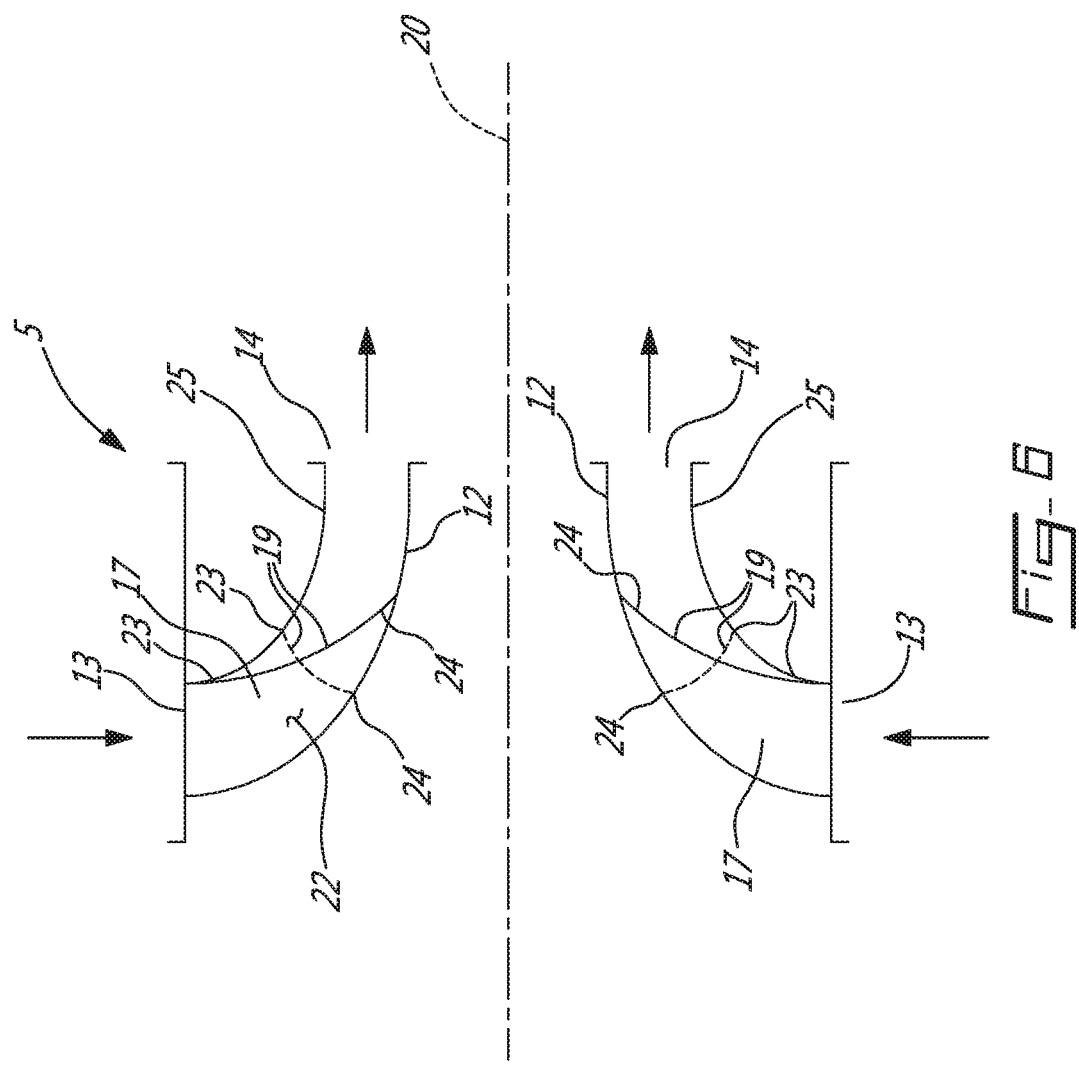

INTER-COMPRESSOR FLOW DIVIDER PROFILING

TECHNICAL FIELD

The disclosure relates generally to gas turbine engines, and more particularly to reduction of flow disturbances.

BACKGROUND

In turbomachinery there is a need to pass sufficient air and oil to the shafts and bearing cavities across the gas path without significant disturbance to the airflow while also providing sufficient structural support to shafts and bearing cavities. Usually large, airfoil-shaped struts bridge from the outer casing of the gas path to the inner surface of the gas path, providing support and allowing air and oil services to be routed through the interior of the strut to bearings and inner elements. Improvement is desirable.

SUMMARY

In one aspect, the disclosure describes an inter-compressor case for a gas turbine engine. The inter-compressor case comprises:

an outer casing and an inner casing radially spaced apart relative to a longitudinal axis;

a gas path extending from a plurality of radial inlets arranged in a circumferentially spaced apart array around the outer casing to an annular outlet defined by an axially extending downstream portion of the outer casing and an axially extending downstream portion of the inner casing;

a plurality of struts having a gas path surface extending across the gas path between the outer casing and the inner casing; and a plurality of flow separators extending from the adjacent radial inlets, the flow separators having trailing edges disposed upstream of the annular outlet, the plurality of flow separators including a plurality of full length flow separators and a plurality of truncated flow separators, the flow separators disposed adjacent to the struts, the truncated flow separators having a truncated trailing edge terminating upstream relative to the trailing edges of the full length flow separators.

The plurality of full length flow separators may define a plurality of full length gas flow channels having a full channel cross-sectional area defined between the trailing edges of a pair of adjacent full length flow separators. The truncated flow separators and struts may define a plurality of truncated gas flow channels between the truncated trailing edge and the gas path surface of the strut. The plurality of truncated gas flow channels may have a truncated channel cross-sectional area not less than the full channel cross-sectional area.

The truncated channel cross-sectional area may be substantially equal to the full channel cross-sectional area.

The truncated trailing edge may be inclined relative to a gas flow direction past the truncated trailing edge.

The truncated trailing edge may be inclined relative to the gas flow direction wherein a radially outward portion of the truncated trailing edge extends beyond a radially inward portion of the truncated trailing edge in one of: an upstream direction; and a downstream direction.

In another aspect, the disclosure describes a method of reducing flow distortion in an inter-compressor case for a gas turbine engine where the inter-compressor case comprises:

an outer casing and an inner casing radially spaced apart relative to a longitudinal axis;

a gas path extending from a plurality of radial inlets arranged in a circumferentially spaced apart array around the outer casing to an annular outlet defined by an axially extending downstream portion of the outer casing and an axially extending downstream portion of the inner casing;

a plurality of struts having a gas path surface extending across the gas path between the outer casing and the inner casing; and a plurality of flow separators extending from the adjacent radial inlets, the flow separators having trailing edges disposed upstream of the annular outlet;

the method comprises:

providing the plurality of flow separators to include a plurality of full length flow separators and a plurality of truncated flow separators, the flow separators disposed adjacent to the struts, the truncated flow separators having a truncated trailing edge terminating upstream relative to the trailing edges of the full length flow separators.

The plurality of full length flow separators may define a plurality of full length gas flow channels having a full channel cross-sectional area defined between the trailing edges of a pair of adjacent full length flow separators. The truncated flow separators and struts may define a plurality of truncated gas flow channels between the truncated trailing edge and the gas path surface of the strut. The plurality of truncated gas flow channels may have a truncated channel cross-sectional area not less than the full channel cross-sectional area.

The truncated channel cross-sectional area may be substantially equal to the full channel cross-sectional area.

The truncated trailing edge may be inclined relative to a gas flow direction past the truncated trailing edge.

The truncated trailing edge may be inclined relative to the gas flow direction wherein a radially outward portion of the truncated trailing edge extends beyond a radially inward portion of the truncated trailing edge in one of: an upstream direction; and a downstream direction.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 1 shows an axial cross-section view of an example gas turbine engine having a low pressure and high pressure centrifugal compressors with an inter-compressor case there between;

FIG. 6 is a schematic axial cross-sectional view through the inter-compressor case along axial plane 6-6 in FIG. 5.

DETAILED DESCRIPTION

In some embodiments, the method described herein truncates the chord length of flow dividers in close proximity to large struts to ensure the flow channel cross-sectional area adjacent to the large struts is not less than or substantially equal to that of the flow channel between full length/non-truncated flow dividers. The extent of the truncation can also vary between the inner casing and outer casing thereby changing the radial distribution of the flow. The flow separators could be selectively tailored to modify the gas flow profile into the downstream high pressure compressor 6 (see FIG. 1) providing an aerodynamic benefit such as a surge margin or improved efficiency. Flow separators can also be staggered or cambered so that the truncation will provide a specific profile of pressure or swirl in the vicinity of the strut. Local gas path changes can also be used to accommodate an increase in cross-sectional area.

Figure 1:
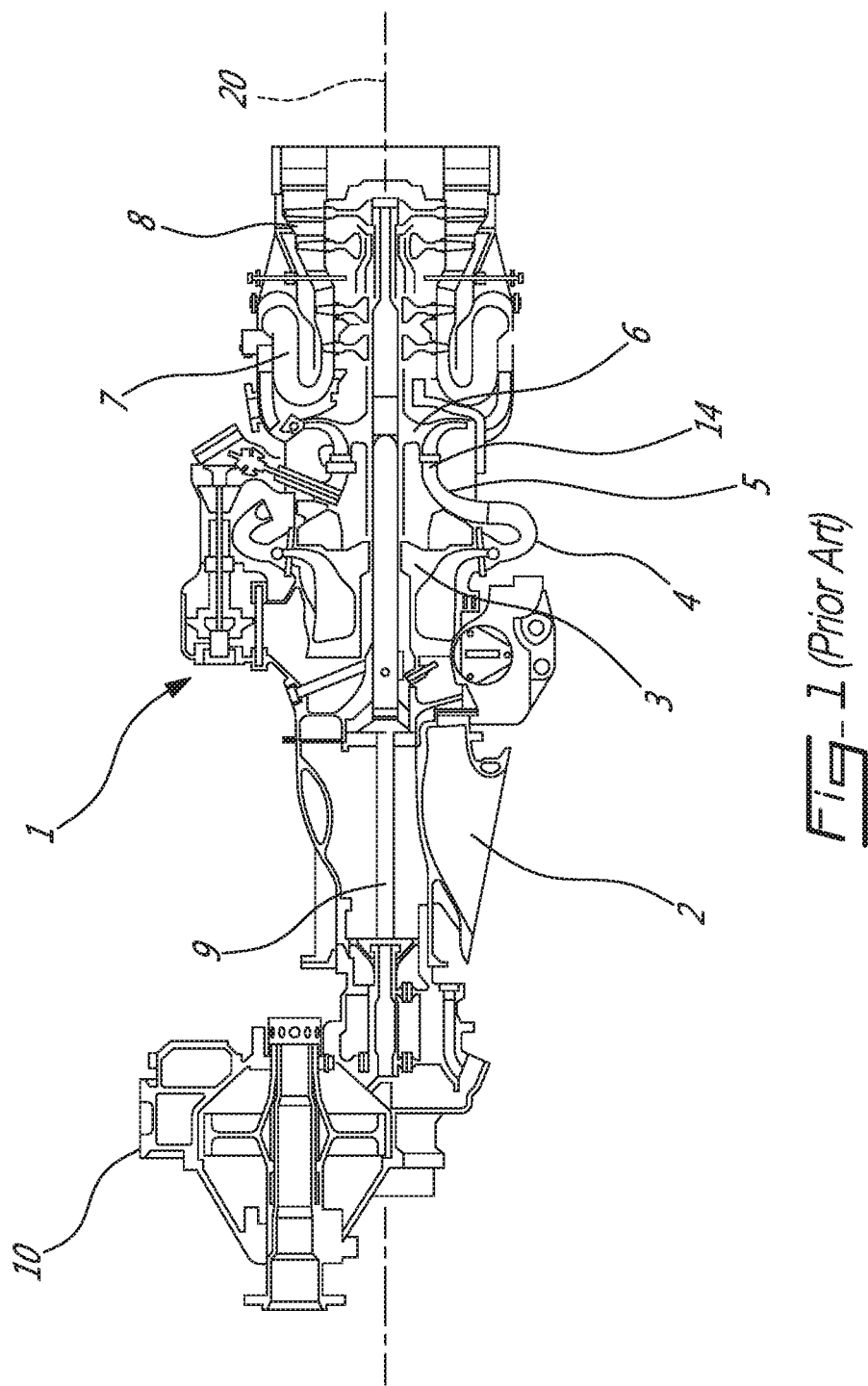

FIG. 1 illustrates a gas turbine engine 1 of a type preferably provided for use in subsonic flight, generally comprising in serial flow communication an air intake duct 2 through which ambient air is propelled, a low pressure centrifugal compressor 3, diffuser ducts 4, an inter-compressor case 5 and a high pressure centrifugal compressor 6 for pressurizing the air, a combustor 7 in which the compressed air is mixed with fuel and ignited for generating an annular stream of hot combustion gases, and a turbine section 8 for extracting energy from the combustion gases, i.e.: high pressure turbines to drive the compressors 3, 6 and low pressure turbines to drive the engine shaft 9 and gear reducer 10.

Figure 2:
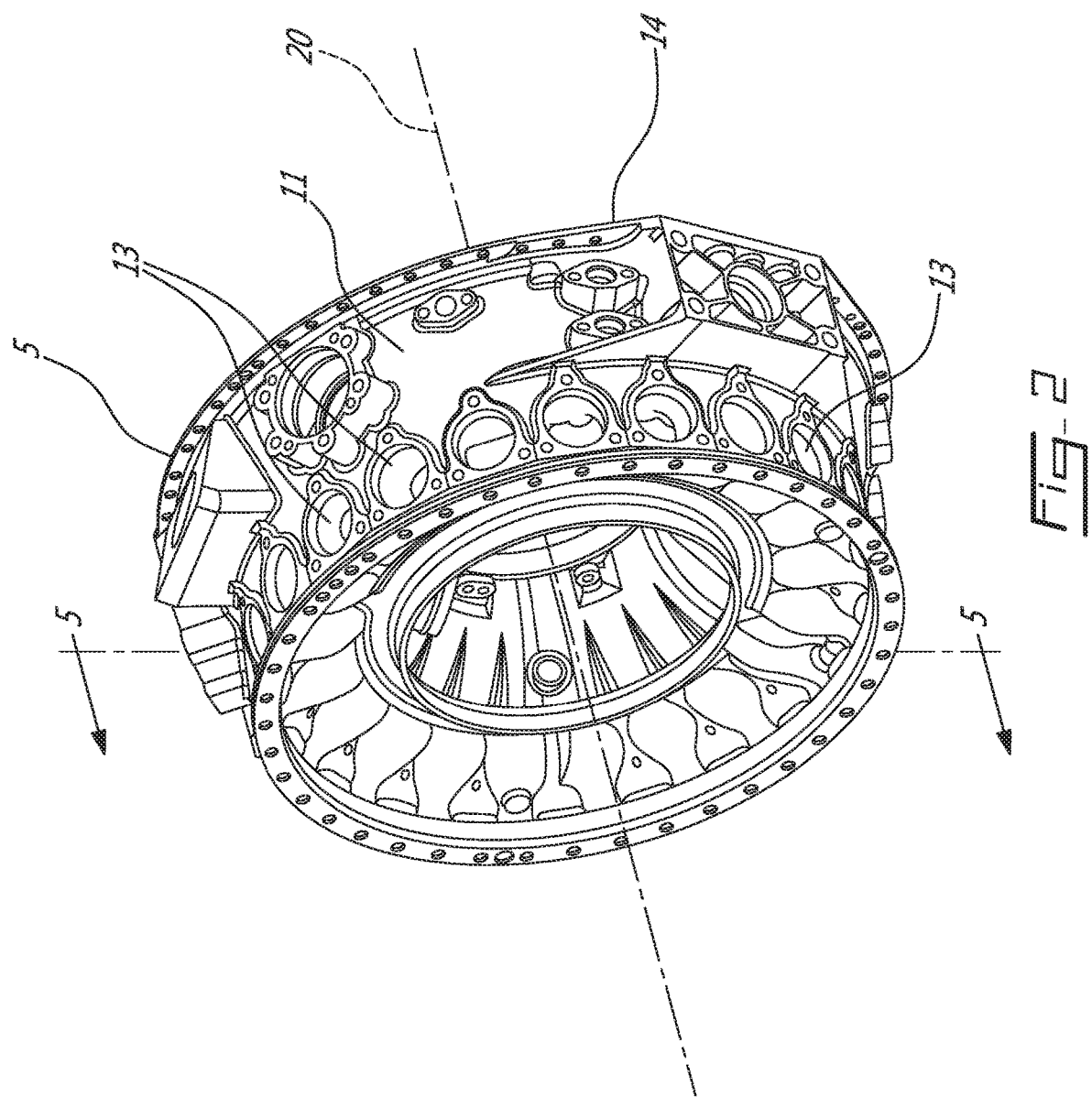
FIG. 2 is a perspective view of an inter-compressor case.

The present description relates to an inter-compressor case (ICC) 5 of the type shown in the example illustrated in FIG. 2. The inter-compressor case 5 has an inner surface 12 radially spaced apart about a longitudinal axis 20 of the engine (FIG. 1). Radial inlets 13 are arranged in a circumferentially spaced apart array on the outer casing 11. As shown in FIG. 1, the radial inlets 13 each connect to separate diffuser ducts 4 that convey compressed air from the outlet of the low pressure centrifugal compressor 3.

An annular outlet 14 (see FIGS. 1-2, 6) conveys air to the inlet of the high pressure centrifugal compressor 6. The annular outlet 14 is defined by an axially extending downstream portion of the outer shroud surface 25 and an axially extending downstream portion of the inner casing 12 (i.e.: the hub).

Figure 5:
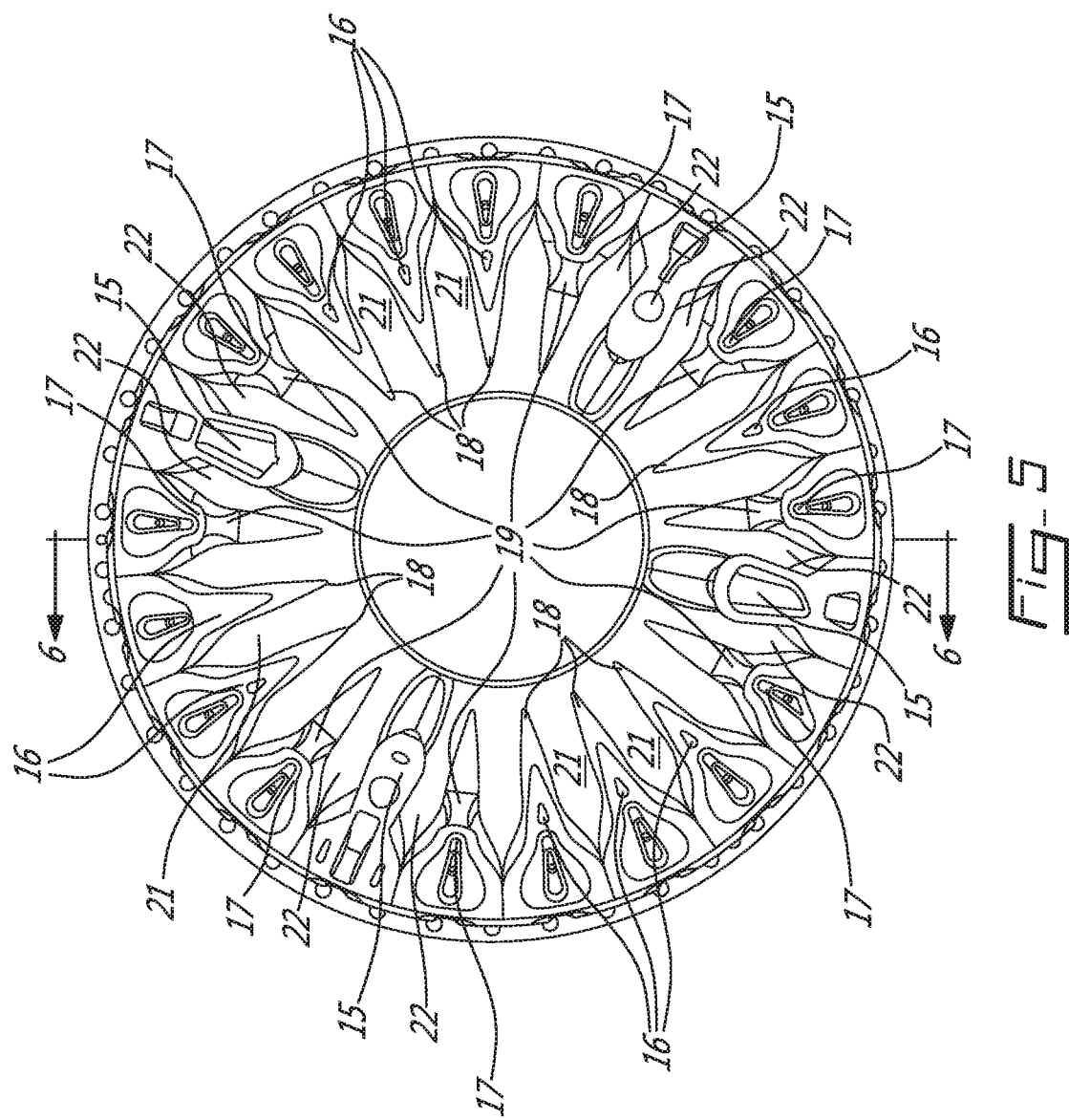
FIG. 5 is a radial cross-sectional view through an inter-compressor case along the transverse plane 5-5 in FIG. 2.

As seen in FIG. 5, a plurality of struts 15 have an exposed gas path surface extending between the outer shroud surface 25 and the inner surface 12. The struts 15 provide structural support between the central shaft bearing cavities and outer engine structures. The struts 15 are usually hollow or provide conduits through which oil or air can be conveyed to the inner engine components such as the shaft bearing cavity.

Referring to FIG. 5 a plurality of wedge shaped flow separators 16, 17 extend from the plurality of radial inlets 13. Each of the plurality of flow separators 16, 17 has a trailing edge 18, 19 disposed upstream of the annular outlet 14. The plurality of flow separators 16, 17 are adapted to receive discrete radial flows of gas from each of the radial inlets 13 and to merge the discrete radial flows of gas into a single annular flow of gas directed to the annular outlet 14.

Figure 3:
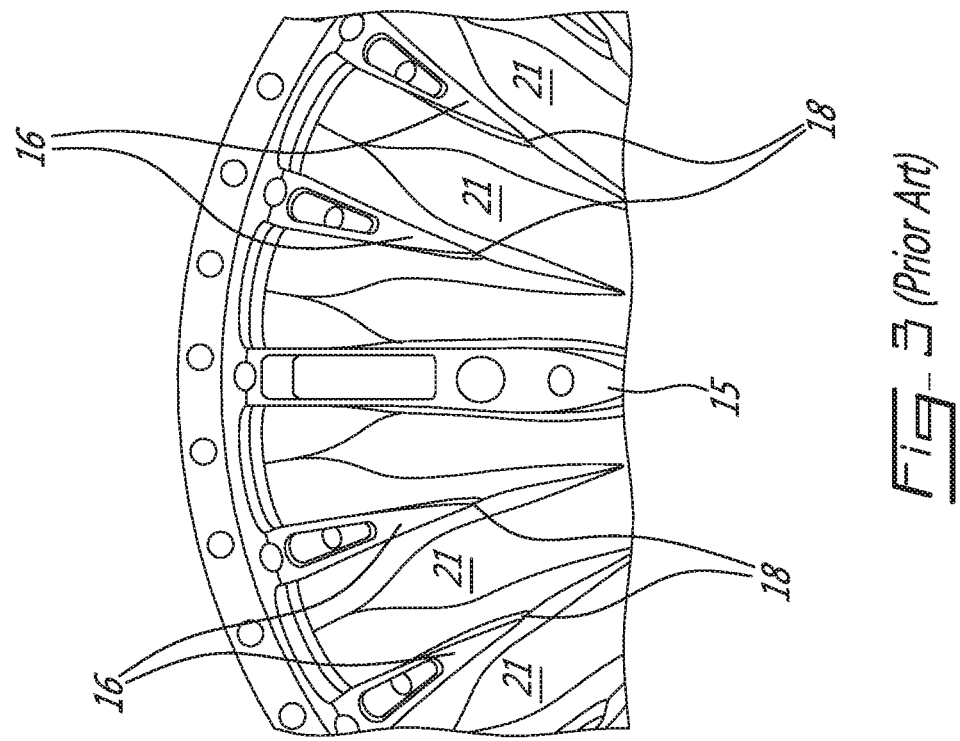
FIG. 3 is a partial radial cross-sectional view through a prior art inter-compressor case showing the narrowing of the gas flow channels between the strut and the pair of adjacent full length flow separators.

FIG. 3 shows a prior art ICC where all flow separators 16 are the same length extending radially inwardly. When struts 15 extend into the gas path, a restriction (circled areas) in the gas flow channel occurs. The restriction in cross-sectional area of the gas flow channels creates a flow disruption or disturbance when a more uniform consistent flow is desirable.

Figure 4:
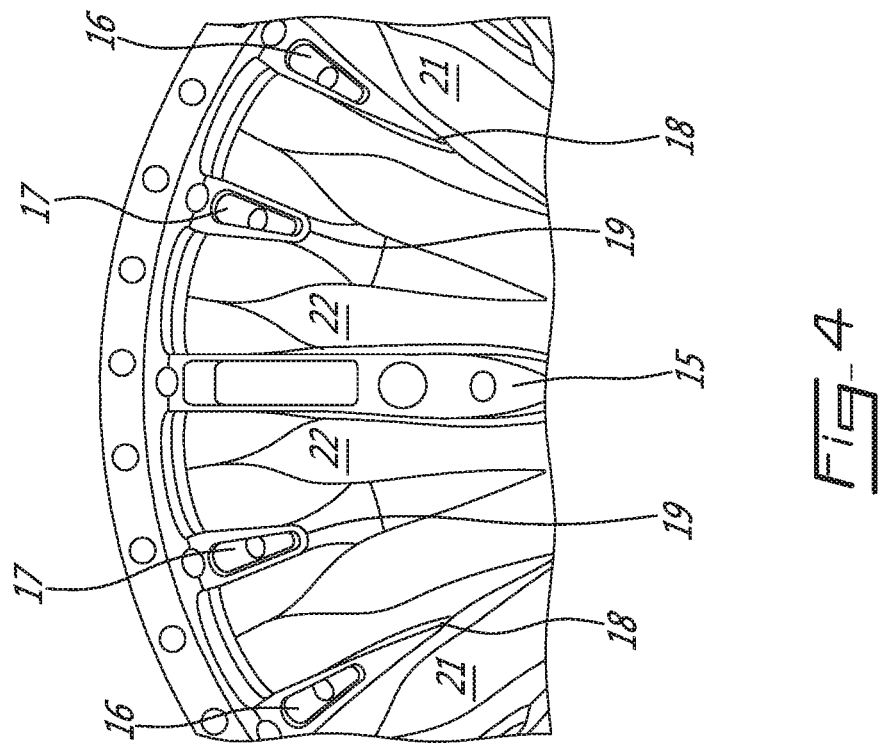
FIG. 4 is a like partial radial cross-sectional view through an inter-compressor case showing the truncation of the pair of truncated flow separators adjacent to the strut to broaden or equalize the cross-sectional area of the truncated gas flow channels compared to full length channels remote from the strut.

FIGS. 4 and 5 show a modification which reduces flow disruption. The radial array of flow separators 16, 17 include a plurality of full length flow separators 16 and a plurality of truncated flow separators 17. The truncated flow separators 17 are located laterally adjacent to each of the struts 15 on either side. The truncated flow separators 17 have a truncated trailing edge 19 disposed upstream from the trailing edges 18 of the plurality of full length flow separators 16.

As shown in FIG. 4, the truncated trailing edge 19 enlarges the cross-sectional area (circled) adjacent to the strut 15 and thereby reduces the gas flow restriction.

As best seen in FIG. 5, the full length flow separators 16 define a plurality of full length gas flow channels 21 having a full channel cross-sectional area defined between the trailing edges 18 of a pair of adjacent full length flow separators 16. The truncated flow separators 17 and struts 15 define a plurality of truncated gas flow channels 22 between the truncated trailing edge 19 and the gas path surface of the strut 15. The plurality of truncated gas flow channels 22 have a truncated channel cross-sectional area (circled area in FIG. 4) not less than the full channel cross-sectional area of the full gas flow channels 21. Ideally the truncated channel cross-sectional area is substantially equal to the full channel cross-sectional area.

Referring to FIG. 6, the truncated gas flow channel 21 is shown guiding gas flow from the radial inlet 13 to the annular outlet 14 as indicated with arrows. The truncated gas flow separator 17 has a truncated trailing edge 19 that is inclined relative to a gas flow direction past the truncated trailing edge 19. In the example shown in FIG. 6 a radially outward portion 23 of the truncated trailing edge 19 extends in an upstream direction beyond a radially inward portion 24 of the truncated trailing edge 19. As shown in dashed lines, the radially outward portion 23 of the truncated trailing edge can also extend in a downstream direction beyond the radially inward portion 24 of the truncated trailing edge 19. In both alternatives, the truncated trailing edge 19 need not be perpendicular to the gas flow direction but may be inclined or cambered to achieve various modifications to the gas flow pattern.

Trimming the truncated trailing edge 19 and providing different profiles to the truncated trailing edge 19 can result in more uniform gas flow or other benefits.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An inter-compressor case for a gas turbine engine, the inter-compressor case comprising:
   an outer casing and an inner casing radially spaced apart relative to a longitudinal axis;
   a gas path extending from a plurality of radial inlets arranged in a circumferentially spaced apart array around the outer casing to an annular outlet defined by an axially extending downstream portion of the outer casing and an axially extending downstream portion of the inner casing;
   a plurality of struts having a gas path surface extending across the gas path between the outer casing and the inner casing; and
   a plurality of flow separators extending from the adjacent radial inlets, the flow separators having trailing edges disposed upstream of the annular outlet, the plurality of flow separators including a plurality of full length flow separators and a plurality of truncated flow separators, the flow separators disposed adjacent to the struts, the truncated flow separators having a truncated trailing edge terminating upstream relative to the trailing edges of the full length flow separators.

2. The inter-compressor case according to claim 1 wherein:
   the plurality of full length flow separators define a plurality of full length gas flow channels having a full channel cross-sectional area defined between the trailing edges of a pair of adjacent full length flow separators; and
   the truncated flow separators and struts defining a plurality of truncated gas flow channels between the truncated trailing edge and the gas path surface of the strut, the plurality of truncated gas flow channels having a truncated channel cross-sectional area not less than the full channel cross-sectional area.

3. The inter-compressor case according to claim 2 wherein the truncated channel cross-sectional area is substantially equal to the full channel cross-sectional area.

4. The inter-compressor case according to claim 1 wherein the truncated trailing edge is inclined relative to a gas flow direction past the truncated trailing edge.

5. The inter-compressor case according to claim 4 wherein the truncated trailing edge is inclined relative to the gas flow direction wherein a radially outward portion of the truncated trailing edge extends beyond a radially inward portion of the truncated trailing edge in one of: an upstream direction; and a downstream direction.

6. A method of reducing flow distortion in an inter-compressor case for a gas turbine engine, the inter-compressor case comprising:
   an outer casing and an inner casing radially spaced apart relative to a longitudinal axis;
   a gas path extending from a plurality of radial inlets arranged in a circumferentially spaced apart array around the outer casing to an annular outlet defined by an axially extending downstream portion of the outer casing and an axially extending downstream portion of the inner casing;
   a plurality of struts having a gas path surface extending across the gas path between the outer casing and the inner casing; and
   a plurality of flow separators extending from the adjacent radial inlets, the flow separators having trailing edges disposed upstream of the annular outlet;
   the method comprising:
   providing the plurality of flow separators to include a plurality of full length flow separators and a plurality of truncated flow separators, the flow separators disposed adjacent to the struts, the truncated flow separators having a truncated trailing edge terminating upstream relative to the trailing edges of the full length flow separators.

7. The method according to claim 6 wherein:
   the plurality of full length flow separators define a plurality of full length gas flow channels having a full channel cross-sectional area defined between the trailing edges of a pair of adjacent full length flow separators; and
   the truncated flow separators and struts defining a plurality of truncated gas flow channels between the truncated trailing edge and the gas path surface of the strut, the plurality of truncated gas flow channels having a truncated channel cross-sectional area not less than the full channel cross-sectional area.

8. The method according to claim 7, wherein the truncated channel cross-sectional area is substantially equal to the full channel cross-sectional area.

9. The method according to claim 6 wherein the truncated trailing edge is inclined relative to a gas flow direction past the truncated trailing edge.

10. The method according to claim 9 wherein the truncated trailing edge is inclined relative to the gas flow direction wherein a radially outward portion of the truncated trailing edge extends beyond a radially inward portion of the truncated trailing edge in one of: an upstream direction; and a downstream direction.

* * * * *